United States Patent [19]

Woodhall

[11] Patent Number: 4,712,483
[45] Date of Patent: Dec. 15, 1987

[54] APPARATUS FOR SUPPORTING A VEHICLE FOR SIDEWAYS MOVEMENT

[76] Inventor: Edward W. Woodhall, 909 Covington Rd., Los Altos, Calif. 94022

[21] Appl. No.: 707,624

[22] Filed: Mar. 4, 1985

[51] Int. Cl.[4] .............................................. B61J 1/12
[52] U.S. Cl. ................................................... 104/48
[58] Field of Search ..................... 104/48; 410/3, 6, 8, 410/9, 30, 49; 414/261, 262, 233, 234, 236

[56] References Cited

U.S. PATENT DOCUMENTS

| | | | |
|---|---|---|---|
| 500,929 | 7/1893 | Moxham | 104/48 |
| 835,015 | 11/1906 | Edinger | 104/48 |
| 1,065,989 | 7/1913 | Verbeke | 238/10 R |
| 1,248,995 | 12/1917 | Bauman et al. | 104/48 |
| 1,473,369 | 11/1923 | Williams et al. | 180/200 |
| 1,722,818 | 7/1929 | Mugler | 104/48 |
| 1,805,910 | 5/1931 | Hawkins | 104/48 |
| 1,842,411 | 1/1932 | Ladd | 198/803.16 |
| 1,847,549 | 3/1932 | Adams | 104/48 |
| 1,902,205 | 3/1933 | Webster | 104/48 |
| 1,986,120 | 1/1935 | Sanford | 105/159 |
| 2,372,927 | 4/1945 | Berg | 280/43.16 |
| 2,400,312 | 5/1946 | Miller | 414/532 |
| 2,634,690 | 4/1953 | Clingan | 104/48 |
| 2,715,370 | 8/1955 | Robson | 104/48 |
| 3,057,306 | 10/1962 | Hatfield | 105/159 |
| 3,086,483 | 4/1963 | Scheldrup | 105/159 |
| 3,524,412 | 8/1970 | Wilson | 104/134 |
| 4,042,118 | 8/1977 | Schmidt | 104/48 X |
| 4,234,069 | 11/1980 | Seiz | 193/35 A |
| 4,462,313 | 7/1984 | Sleep et al. | 104/48 X |

FOREIGN PATENT DOCUMENTS

| | | | |
|---|---|---|---|
| 664145 | 6/1963 | Canada | 104/44 |
| 387810 | 1/1924 | Fed. Rep. of Germany. | |
| 873853 | 4/1942 | France. | |

Primary Examiner—David A. Scherbel
Assistant Examiner—Charles Barrett
Attorney, Agent, or Firm—Townsend and Townsend

[57] ABSTRACT

Apparatus for supporting a vehicle so that it can be moved sideways by manual force. The apparatus includes a floor part having a pair of spaced, generally parallel grooves. Each groove has a pair of roller members coupled to it, and the roller members of the two grooves are alignable with each other so that a vehicle can be driven onto the roller members and be supported thereby. Each roller member has a lower extension or lip extending into a respective groove so that, when a sideways force is applied to the vehicle, the vehicle is moved sideways as the roller members are guided by the grooves. The invention is suitable for moving vehicles from one lane to an adjacent lane when the lanes are in side-by-side relationship to each other.

26 Claims, 6 Drawing Figures

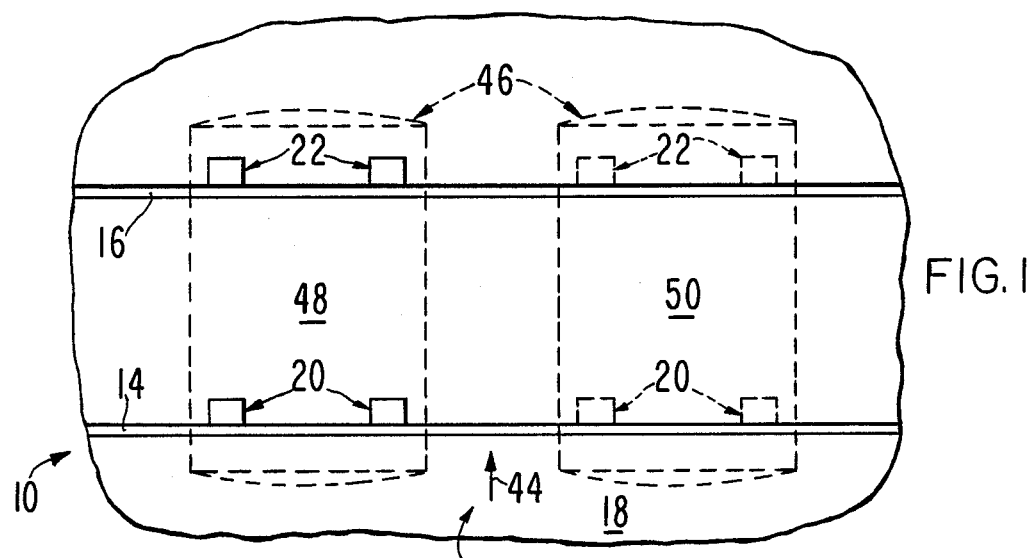
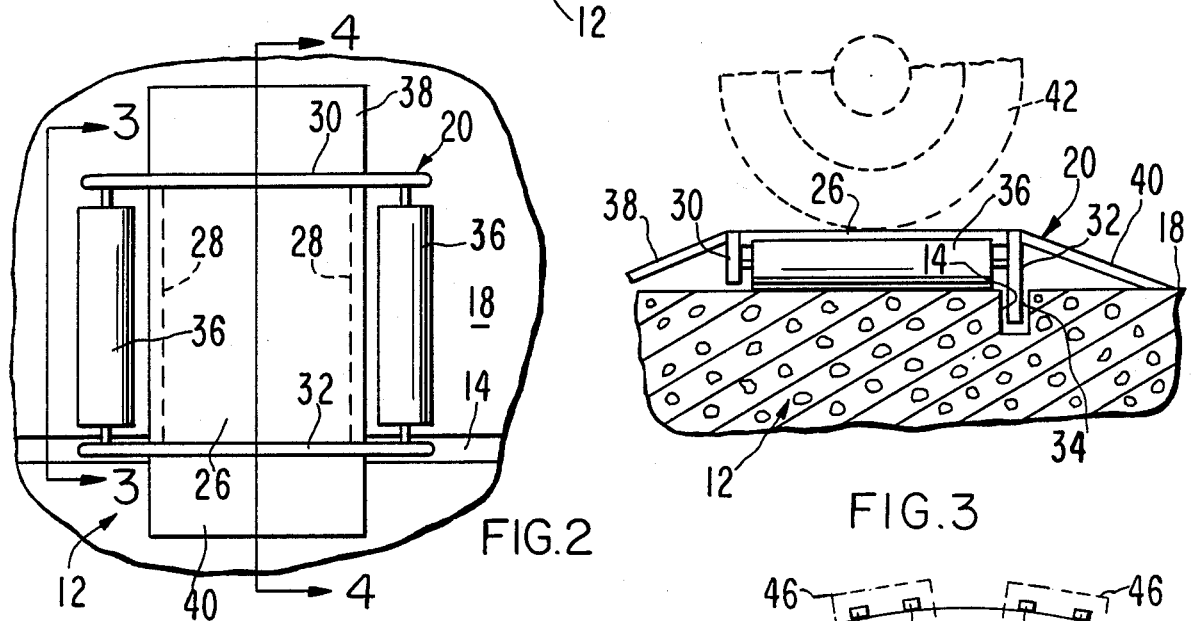
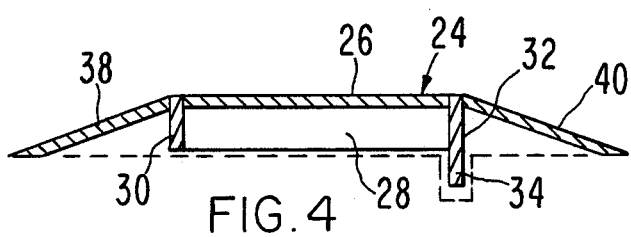
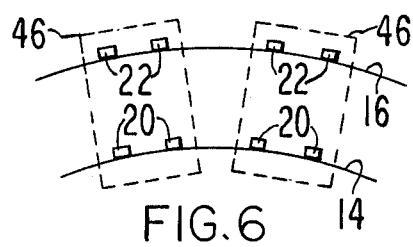
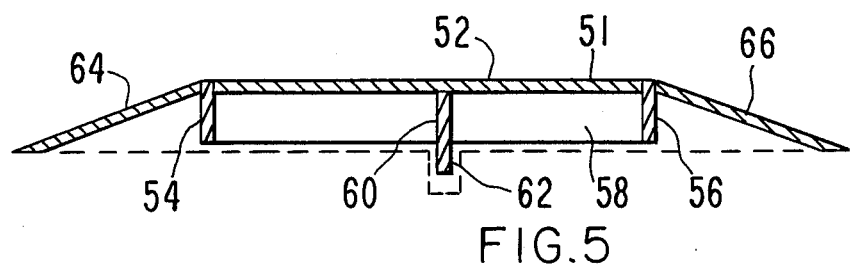

APPARATUS FOR SUPPORTING A VEHICLE FOR SIDEWAYS MOVEMENT

BACKGROUND OF THE INVENTION

1. Field of the Invention

This invention relates to improvements in the way vehicles are moved sideways and, more particularly, to apparatus for moving a vehicle laterally of its wheel base over a floor surface.

2. Description of the Prior Art

In automobile body and paint shops, it is often necessary to place a vehicle in a specific location, such as in a paint booth for spray painting the exterior surface of the vehicle. Generally, an automobile body and paint shop has two or more longitudinally extending lanes, and the vehicles are moved successively into stationary positions at work stations along the lanes. While at the work stations, work is performed on the vehicles, such as body work, scraping of paint from the vehicle surface and the like.

At certain times, it is desirable and sometimes necessary to move a vehicle from one lane into an adjacent lane so that the vehicle can be advanced to another work station, such as a paint booth. To move the vehicle into the other lane when there is no room to maneuver, it is necessary to completely move the vehicles behind or in front of the vehicle to be moved, and this requires several drivers and considerable time and effort to effect the move itself.

While attempts have been made to provide structures for accomplishing sideways movement of a vehicle in longitudinally extending lanes of the type described, such structures have generally been extremely complex in construction and bulky to assemble and use. They have also required a considerable amount of space and are expensive to produce and maintain. Moreover, such structures are permanently put into place so that the floor surface on which the structures are mounted have a limited use.

Because of the foregoing disadvantages, the structures of the type described are not satisfactory and a need has continued to exist for an improved apparatus for accomplishing sideways movement of vehicles in adjacent vehicle lanes. The present invention satisfies this need as hereinafter described.

SUMMARY OF THE INVENTION

The present invention is directed to an improved apparatus which is comprised of a floor or floor part having a pair of spaced grooves, and a number of roller members coupled to the grooves, there being a pair of roller members for each groove, respectively. The roller members are adapted for supporting the wheels of a vehicle on the floor so that the vehicle can be pushed sideways. Each roller member has a lip or extension removably received within a respective groove, so that the grooves guide the roller members as the vehicle is pushed sideways.

The roller members are independent of each other and are manually alignable so that, with the proper spacing between the grooves, a vehicle can be driven onto the roller members and be supported thereby, whereupon by applying a sideways force to the vehicle, the roller members will move laterally or transversely of the wheel base of the vehicle and longitudinally of the grooves. In this way, the roller members effect sideways movement of the vehicle from one lane to an adjacent lane.

In carrying out the teachings of the present invention, each roller member has a wall from which its extension projects. The roller members for the front and rear wheels of a vehicle are kept properly spaced apart by the grooves. Thus, the apparatus permits a vehicle to be moved quickly and easily onto the roller members, yet a single person can move the vehicle sideways or laterally inasmuch the roller members are in rolling engagement with the upper surface of the floor part.

Another desirable feature of the present invention is that the roller members can be lifted off the floor and stored in a suitable location, and the floor can be used in a normal fashion unencumbered by the presence of the roller members themselves. Furthermore, there is no connection between the roller members so that they can be quickly and easily put into place in coupled relationship with the floor part by a single person without special skills.

The floor part itself can be of any suitable material, such as concrete, wood or the like. Moreover, the grooves can be formed in the floor when the floor is constructed or even after the floor has been laid. The grooves themselves can be parallel or any other shape, such as curved, commensurate with the purpose of the invention, namely to allow movement of a vehicle transversely of its wheel base from one operative position to another, such as from one lane to an adjacent lane.

The primary object of the present invention is to provide an improved vehicle support apparatus for allowing sideways movement of a vehicle from one operative position to a second operative position and return, wherein the apparatus is simple and rugged in construction, is inexpensive to produce and maintain and can be quickly and easily assembled and made ready for use by a single person, all of which can be done in a minimum of time and with a minimum of effort.

Another object of the present invention is to provide an improved vehicle supporting apparatus of the type described wherein the apparatus is comprised of a number of roller members in rolling engagement to a floor surface and in coupled relationship to a pair of grooves in the floor so that the roller members can be guided by the grooves and the apparatus can be used for quickly and easily moving a vehicle from one lane to an adjacent lane by manually applying a sideways force to the vehicle.

Other objects of this invention will become apparent as the following specification progresses, reference being had to the accompanying drawing for an illustration of the invention.

IN THE DRAWINGS

FIG. 1 is a fragmentary, top plan view of the present invention showing the way in which the vehicle supporting roller members are mounted on a floor having a pair of spaced grooves extending into the floor and further illustrating the vehicle in two side-by-side lanes;

FIG. 2 is an enlarged, fragmentary, top plan view of one of the roller members of the present invention;

FIG. 3 is a cross sectional view taken along line 3—3 of FIG. 2;

FIG. 4 is a cross sectional view taken along line 4—4 of FIG. 2;

FIG. 5 is a view similar to FIG. 4, but showing another embodiment of the main body part of a roller member forming a portion of the present invention and FIG. 6 is a schematic view of the invention showing curved grooves in the floor.

DETAILED DESCRIPTION OF THE PREFERRED EMBODIMENT

The vehicle supporting and moving apparatus of the present invention is broadly denoted by the numeral 10 and includes a floor or floor part 12 having a pair of spaced, generally parallel grooves 14 and 16 formed in the floor and extending below the plane of the upper surface 18 of the floor. The depth of the groove typically can be 1 to 3 inches. The floor can be of any suitable material, such as concrete, wood or the like and typically, the floor is flat and generally horizontal. Grooves 14 and 16 can be formed in the floor when the floor is constructed. In the alternative, the grooves can be formed after the floor has been laid.

Apparatus 10 includes four roller members on floor part 12, there being a pair of roller members 20 for groove 14 and a pair of roller members 22 for groove 16. The roller members are substantially identical with each other so that a description of one roller member will suffice for a description of the other roller members.

For purposes of illustration, roller member 20 is described with reference to FIGS. 2-4.

Roller member 20 includes a main body 24 comprised of a top plate 26 having a flat upper surface, a pair of opposed, generally parallel side plates 28 (shown in dashed lines in FIG. 2), and a pair of end plates 30 and 32 (FIGS. 2-4). Plates 26, 28, 30 and 32 are all welded or otherwise rigidly secured together and are formed of a heavy duty steel or other suitable metal material. The side plates 28 are of the same height, but the end plates 30 and 32 are of different heights. Plate 30 is generally of the same height as side plates 28, but end plate 32 is wider than plate 30 and has a lower lip or extension 34, whereby the extension can be removably received within a corresponding groove, such as groove 14 as shown in FIG. 3.

End plates 30 and 32 project laterally in opposed direction from adjacent side plates 28 in the manner shown in FIG. 2. These outer end projections of the end plates are used to rotatably mount a pair of cylindrical rollers 36 having shafts coupled with the end projections, whereby the longitudinal axes of rollers 36 are generally parallel with each other and parallel with side plates 38. Rollers 36 are of heavy duty, high strength material, such as a suitable steel. The rollers are mounted such that they are adapted to engage the upper surface 18 of floor part 12 on one side of an adjacent groove, such as groove 14 as shown in FIG. 3. Side plates 28 and end plate 30 do not touch floor surface 18, and plate 32 extends into groove 14 and is guided thereby as the rollers 36 roll over surface 18. Rollers 36 thereby permit the roller member 20 to shift over floor surface 18 longitudinally of the corresponding groove. Moreover, roller members 20 and 22 are not connected to each other so that they are moveable independently of each other.

Each of the roller members further includes a pair of inclined plates 38 and 40 which are adjacent to and extend outwardly from the upper extremities of respective end plates 30 and 32. Plates 38 and 40 provide ramps for allowing the wheel of a vehicle to move upwardly and onto the upper surface of top plate 26 when the roller member is mounted on floor part 12 in the manner shown in FIG. 1. FIG. 3 shows a wheel 42 in dashed lines as being supported on plate 26 of the respective roller member 20.

In use, roller members 20 and 22 are placed on floor part 12 near adjacent grooves 14 and 16. The end plates 32 of the various roller members are aligned with and received in respective grooves 14 and 16. Thus, the roller members 20 and 22 can shift longitudinally of the grooves since the various rollers 36 are in rolling engagement with upper surface 18 of floor part 12. For purposes of illustration, the roller members are on the front sides of grooves 14 and 16 with reference to the forward direction of movement of a vehicle as indicated by an arrow 44 (FIG. 1).

With roller members 20 and 22 in place with their lower extensions 34 of end plates 32 removably received in respective grooves 14 and 16, the roller members are shifted so that one of the roller members 20 is aligned with a roller member 22, and the roller members of each groove are a sufficient distance apart. Thus, the wheels of a vehicle will move onto roller members 20 and 22 and become supported by the roller members themselves. In such a case, the wheels will be in a position as shown in dashed lines in FIG. 3 and the vehicle will be completely supported above surfaces 18 on roller members 20 and 22.

A vehicle denoted by the numeral 46 is shown in a first operative position 48 in FIG. 1 in dashed lines overlying grooves 14 and 16 and roller members 20 and 22. FIG. 1 also shows that the vehicle 46 is moveable sideways into a second operative position 50 spaced laterally from position 48. This is accomplished by moving the vehicle manually from position 48 toward position 50. This can readily be accomplished since members 20 and 22 are easily rolled over surface 18 longitudinally of grooves 14 and 16. A single person can apply a side force to the vehicle and "walk" it to position 50. The vehicle can then be moved forwardly off roller members 20 and 22 in a normal fashion if such is desired, or the vehicle can be returned to position 48 by manually moving it in the opposite direction.

If the wheel base of the vehicle is greater than the spacing shown between an aligned pair of roller members 20 and 22, one of the roller members can be moved to the opposite side of the respective groove to increase the distance between the aligned pair of roller members 20 and 22. Furthermore, one pair or all of the roller members can be replaced by roller members having longer main bodies as shown in FIG. 5.

To this end, a main body 51 has a top plate 52 which is longer than plate 26. End plates 54 and 56 are secured to the end margin of top plate 52, and side plates 58 are secured to the side margins of the top plate 52. A central plate 60 depends from top plate 52 and has a lower lip or extension 62 which is removably received within a respective groove. Thus, rather than having the lower extension on an end plate, it can be on the central plate 60. With a longer top plate 52, it will not be necessary to re-position the roller members to accommodate wheel bases of different lengths. Body 51 has inclined end plates 64 and 66 which serve as ramps as described above with respect to inclined plates 38 and 40 of FIG. 4.

The present invention provides a vehicle supporting and moving apparatus which is simple and rugged in construction, can be made at minimum cost and requires substantially no maintenance. The floor can be made completely flat by removing the roller members from the floor so that the floor can be used for other purposes. On the other hand, to condition the floor for use in supporting and moving a vehicle laterally, roller members 20 and 22 can be quickly and easily into place by merely lowering them onto the floor with the lower extensions 34 or 62 received within the respective grooves. Since the roller members are not connected with each other, they can be readily removed from the floor and stored in a minimum of space. Moreover, the roller members can be made sufficiently light weight so that they can be manually picked up and carried between their operative positions and a storage location.

While grooves 14 and 16 have been shown as being rectilinear, they can also be curved as shown in FIG. 6 or of other shapes, if desired, consistent with the purpose of the teaching of the present invention, namely to move a vehicle from one location transversely into a second location transversely of the wheel base of the vehicle.

I claim:

1. Apparatus for supporting and moving a vehicle comprising:
a floor part having an upper surface and a pair of spaced grooves extending into the upper surface thereof;
a pair of roller members for each groove, respectively, each pair of roller members being adjacent to the respective groove and movable in rolling relationship over the upper surface of the floor part, the pair of roller members corresponding to one groove being movable independently of the pair of roller members corresponding to the other groove; and
means on each pair of roller members, respectively, and extending into the respective groove for coupling the pair of roller members to the respective groove for movement longitudinally of the groove, each pair of roller members having an upper, wheel-supporting surface.

2. Apparatus as set forth in claim 1, wherein each roller member includes a top wall, a pair of end walls, and a pair of inclined plates projecting outwardly from the upper margins of the end walls to serve as ramps for allowing a wheel of a vehicle to move onto the top wall for support thereby.

3. Apparatus for supporting and moving a vehicle comprising:
a floor part having an upper surface and a pair of spaced grooves extending into the upper surface thereof;
a pair of roller members for each groove, respectively, each pair of roller members being adjacent to the respective groove, each roller member being movable independently of the other roller members relative to the floor part; and
means on each roller member, respectively, for coupling the roller member to the respective groove for movement longitudinally of the groove, each roller member having an upper, wheel-supporting surface.

4. Apparatus for supporting and moving a vehicle comprising:
a floor part having an upper surface and a pair of spaced grooves extending into the upper surface thereof;
a pair of roller members for each groove, respectively, each pair of roller members being adjacent to the respective groove; and
an extension on each roller member, respectively, each extension being removably received within and guided by the corresponding groove for coupling the roller member to the respective groove for movement longitudinally of the groove, each roller member having an upper, wheel-supporting surface.

5. Apparatus as set forth in claim 4, wherein each roller member has a pair of end walls, said extension being on the lower margin of one of the end walls.

6. Apparatus as set forth in claim 4, wherein each roller member includes a pair of end walls and a central wall intermediate the end walls, said extension being on the lower margin of the central wall.

7. Apparatus for supporting and moving a vehicle comprising:
a floor part having an upper surface and a pair of spaced grooves extending into the upper surface thereof;
a pair of roller members for each groove, respectively, each pair of roller members being adjacent to the respective groove, each roller member including a top wall, a pair of side walls, and a pair of end walls, there being a pair of rollers adjacent to respective side walls and located between and rotatably mounted on the outer ends of respective end walls, said rollers being in rolling engagement with the upper surface of the floor part; and
means on each roller member, respectively, for coupling the roller member to the respective groove for movement longitudinally of the groove, each roller member having an upper, wheel-supporting surface.

8. Apparatus as set forth in claim 7, wherein is further included a pair of inclined plates secured to and extending outwardly from the upper margins of the end walls, said inclined plates serving as ramps for guiding a vehicle wheel onto the top plate for support thereby.

9. Apparatus as set forth in claim 7, wherein one of the end walls has said coupling means on a lower margin thereof.

10. Apparatus as set forth in claim 9, wherein said coupling means includes an extension projecting into the corresponding groove and guided thereby.

11. Apparatus as set forth in claim 10, wherein the extension has a width complemental to the width of the corresponding groove.

12. Apparatus as set forth in claim 10, wherein is included a central wall intermediate the end walls, said central wall having a lower extension defining said coupling means.

13. Apparatus for supporting and moving a vehicle comprising:
a floor part having an upper surface and a pair of spaced grooves extending into the upper surface thereof, the grooves being rectilinear and generally parallel with each other;
a pair of roller members for each groove, respectively, each pair of roller members being adjacent to the respective groove; and
means on each roller member, respectively, for coupling the roller member to the respective groove for movement longitudinally of the groove, each roller member having an upper, wheel-supporting surface.

14. Apparatus for supporting and moving a vehicle over a floor part having an upper surface and a pair of spaced grooves extending into the upper surface thereof, said apparatus comprising:
- a pair of roller members for each groove, respectively, each pair of roller members being adjacent to the respective groove and movable over the upper surface of the floor part, the pair of roller members corresponding to one groove being movable independently of the pair of roller members corresponding to the other groove; and
- extension means on each pair of roller members, respectively, each extension means being removably receivable in a respective groove for coupling the respective pair of roller members to the respective groove for movement longitudinally of the groove, each pair of roller members having an upper, wheel-supporting surface.

15. Apparatus as set forth in claim 14, wherein each roller member is movable independently of the other roller members relative to the floor part.

16. Apparatus as set forth in claim 14, wherein each roller member has a pair of end walls, each extension being on the lower margin of one of the end walls of the respective roller member.

17. Apparatus as set forth in claim 14, wherein each roller member includes a pair of end walls and a central wall intermediate the end walls, said extension being on the lower margin of the central wall.

18. Apparatus as set forth in claim 14, wherein each roller member includes a top wall, a pair of end walls, and a pair of inclined plates projecting outwardly from the upper margins of the end walls to serve as ramps for allowing a wheel of a vehicle to move onto the top wall for support thereby.

19. Apparatus as set forth in claim 14, wherein each roller member includes a top wall, a pair of side walls, and a pair of end walls, there being a pair of rollers adjacent to respective side walls and located between and rotatably mounted on the outer ends of respective end walls, said rollers being in rolling engagement with the upper surface of the floor part.

20. Apparatus as set forth in claim 19, wherein is further included a pair of inclined plates secured to and extending outwardly from the upper margins of the end walls, said inclined plates serving as ramps for guiding a vehicle wheel onto the top plate for support thereby.

21. Apparatus as set forth in claim 19, wherein one of the end walls has the respective extension on the lower margin thereof.

22. Apparatus as set forth in claim 14, wherein the extension has a width complemental to the width of the corresponding groove.

23. Apparatus as set forth in claim 19, wherein is included a central wall intermediate the end walls, said central wall having a lower extension defining said coupling means.

24. Apparatus as set forth in claim 14, wherein said grooves are rectilinear and generally parallel with each other.

25. Apparatus as set forth in claim 14, wherein said grooves are curved.

26. Apparatus for supporting and moving a vehicle comprising:
- a floor part having an upper surface and a pair of spaced grooves extending into the upper surface thereof, said grooves being curved;
- a pair of roller members for each groove, respectively, each pair of roller members being adjacent to the respective groove and movable in rolling relationship over the upper surface of the floor part; and
- means on each roller member, respectively, and extending into the respective groove for coupling the roller member to the respective groove for movement longitudinally of the groove, each roller member having an upper, wheel-supporting surface.

* * * * *